April 15, 1969  P. J. SENG  3,438,671
ADAPTER FRAME WITH TWIST LOCKS FOR REMOVABLE
ATTACHMENT TO A CARGO CONTAINER
Filed March 24, 1967  Sheet _1_ of 4

INVENTOR.
PAUL J. SENG
BY
Max R. Millman
ATTORNEY.

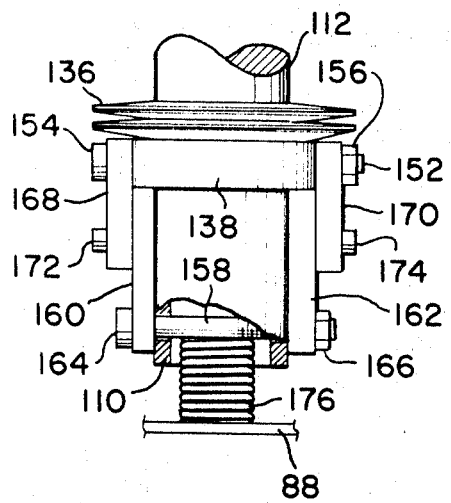
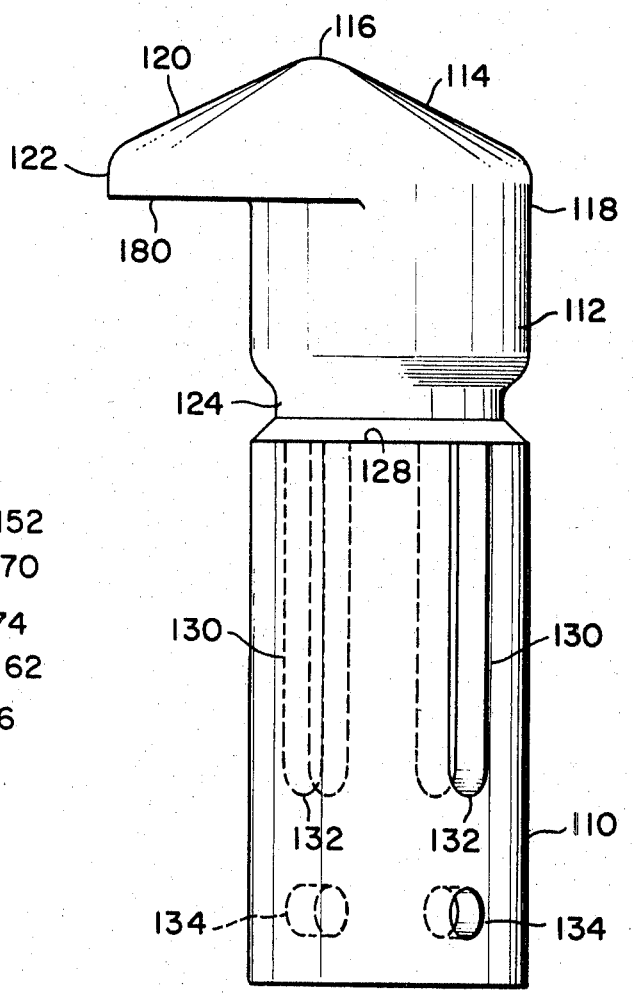

United States Patent Office 3,438,671
Patented Apr. 15, 1969

3,438,671
ADAPTER FRAME WITH TWIST LOCKS FOR REMOVABLE ATTACHMENT TO A CARGO CONTAINER
Paul J. Seng, Langhorne, Pa., assignor to Strick Corporation, Fairless, Hills, Pa., a corporation of Pennsylvania
Filed Mar. 24, 1967, Ser. No. 625,779
Int. Cl. B62d 33/00, 23/00
U.S. Cl. 296—35                                    5 Claims

ABSTRACT OF THE DISCLOSURE

For use with van-size cargo containers which are transferrable as such intermodally to railroad cars, ships, aircraft, etc., an adapter frame or chassis equipped with twist locks to effect removable mounting of the container on the frame employing means to draw the container tightly against the frame in the locked position.

---

In the modern development of freight haulage known as containerization, van size cargo bodies serve as shipping containers and are transferred as such intermodally from over-the-road running gear to railroad flat cars, to ships, to aircraft and the like and the containers are unloaded only at the point of destination. In one form of containerization an adapter frame or chassis containing running gear is separably coupled to the container as shown and described in application Ser. No. 461,393 filed June 4, 1965 now U.S. Patent 3,317,219.

The primary object of this invention is to provide such an adapter frame or chassis with means to removably lock it to the container so that, in the locked position, the container is firmly drawn against the frame to minimize relative movement between them.

Another object of the invention is to provide an adapter frame or chassis with a rotatable means to removably lock the container in place thereon employing toggle action to firmly draw the container against the frame.

Another object of the invention is to provide an adapter frame or chassis with rotatable toggle action twist locks adapted to extend into and engage the lower corner members of a container, the construction and arrangement of parts being such that the twist locks can be readily inserted into the corner members and serve to properly align the container with the frame, can be easily rotated to the operative coupled position and by an added simple downward movement can be urged to the final locked position in firm engagement with the corner members thereby drawing the container against the frame.

These and other objects of the invention will become more apparent as the following description proceeds in conjunction with the accompanying drawings, wherein:

FIG. 6 is an elevational view taken from the line 6—6 of FIG. 3;

FIG. 7 is an enlarged side elevational view of the coupling pin per se; and

Specific reference is now made to the drawings in which similar reference characters are used for corresponding elements throughout.

Figure 1:
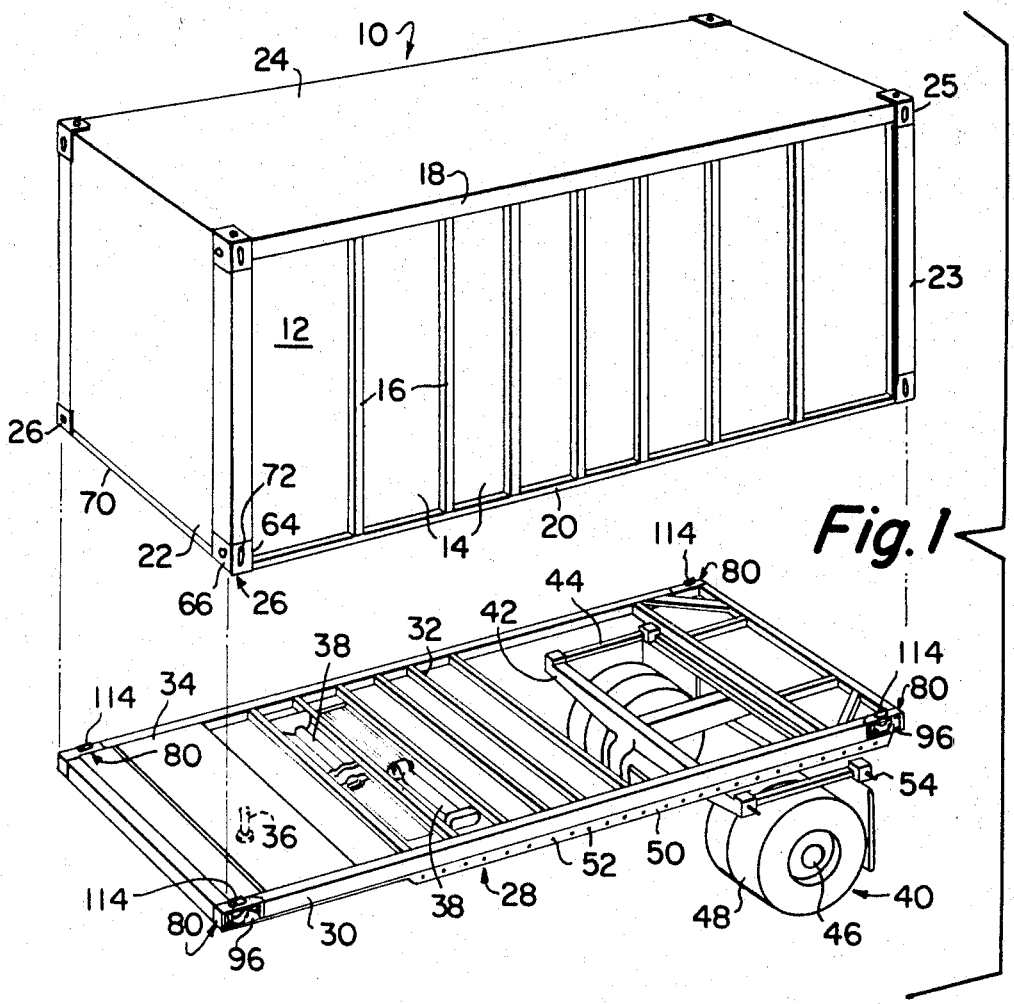
FIG. 1 is a group perspective view of a container and adapter frame of the instant invention.

Indicated at 10 is a van size cargo or trailer body of stressed skin construction whose sidewalls 12 consist of metallic sheets in the form of panels 14 which are secured to and between vertical posts 16 the function of which is to prevent buckling of the sidewalls. The panels and posts are secured by appropriate means to a top longitudinal rail 18 and a bottom longitudinal rail 20. This construction is continued for the end walls 22 except that the rear end wall (not shown fully) will contain the usual doors. To complete the container, which is preferably rectangular, vertical corner posts 23 are provided, a roof sheet 24 is secured to and between the top rails; and cross sills (not shown) are connected across the bottom rails 20 upon which a floor (not shown) is installed. In this stressed skin construction, known in the trade as frameless, a load on the floor is taken by the sidewalls 12 and the sheets or skin 14 are an esential part of the load-carrying system. Secured to the corner posts and rails are upper corner members, fittings or castings 25 and lower members, fittings or castings 26.

An adapter frame 28 is provided which preferably runs the full length and width of the container and comprises longitudinal side beams 30 joined by cross members 32. Adjacent its front end the frame mounts a plate 34 having a depending king pin 36. Immediately to the rear of the king pin assembly are longitudinally staggered conventional supports or landing gears 38 which are hingedly connected at their upper ends about longitudinal pins secured between adjacent cross members 32 so that the landing gears can be extended to vertical positions in which their feet can engage the ground or can be folded to horizontal positions beneath the container and between the cross members so that the wheeled unit or bogie 40 can pass unobstructed from one adapter frame to the next, as will be described hereinafter.

The bogie 40 consists essentially of a frame having cross members 42 joined by longitudinal side members 44. The bogie frame flexibly mounts springs on both sides thereof (not shown) which centrally support a single transverse axle 46 which in turn mounts wheels 48 at its ends. The bogie is, of course, provided with a brake mechanism and hose connections to the emergency and service lines of the tractor, as is well known in the art.

Affixed by welding or other suitable means to the bottom of side members 30 of the adapter frame and extending for a predetermined length to the rear of the adapter frame are track angles 50, each including a horizontally extending portion and a vertically extending portion, the latter at an angle of about 15° to the vertical, the vertically extending portion including longitudinally spaced apertures 52 which are in transverse alignment with the apertures on the track angle on the other side of the adapter frame.

Each bogie is equipped with a releasable coupling mechanism of the type shown and described in Patent Nos. 3,004,772 and 2,831,700 consisting of crank-operated spring urged pins 54 which extend laterally through members adjacent the corners of the bogie frame. When the pins are released they extend as well through selected apertures 52 in the track angles and thus couple the bogie to the adapter frame in adjusted positions. When the pins 54 are retracted, the bogie is free to slide beneath the adapter frame.

The lower corner member, fitting or casting 26 is essentially a hollow cubiform member having a top horizontal wall 56, an inner vertical end wall 58, a horizontal bottom wall 60, an inner vertical side wall 62, an outer vertical side wall 64 and an outer vertical end wall 66 forming between them a generally cuboid cavity 68. The inner end wall 58 is welded to a steel connector (not shown) which is in turn bolted to the end of the channel side rail 20, the top wall 56 is welded to the lower edge of the hollow corner post 23 and the inner side wall 62 is welded to the end of transversely extending channel bottom sills 70 which form the lower horizontal frame members of the end structure. The outer side wall 64 is provided with an elongated slot 72 which is adapted to receive a suitable retaining device. The bottom wall 60 is provided with an elongated slot 74. The outer end wall 66 is provided with a circular opening having a conical tapered throat 76 which communicates with a narrower elongated slot which in turn communicates with the cavity 68.

Each twist lock unit is indicated at 80, is mounted at the corners of the adapter frame 28 and is individually operable manually. Since all the units are alike, description of a single unit will suffice. The unit comprises a housing 82 rotatably mounting a coupling member 84.

The housing includes spaced upper and lower horizontal walls 86 and 88 interconnected by end vertical walls 90 and 92 and an inner vertical side wall 94, the outer vertical side of the housing being open as at 96. For reinforcing purposes, the upper wall 86 is provided with a gusset 98 which extends from the inner side wall 94 to the outer side opening 96. Tacked terminally to the gusset and to the lower wall 88 is a vertical stop bar 100 which is spaced a predetermined distance inwardly of the edge of the housing forming the side opening 96. Spaced laterally and outwardly from the stop bar 100 is a relatively short upstanding retaining lug 102 which is tacked to the lower wall 88. Upstanding from the outer surface of the upper wall 86 is a filler member 104 in the form of a bar whose thickness approximates that of the bottom wall 60 of the lower container corner member 26 and whose width approximates but is somewhat less than the width of the slot 74 in the container corner casting bottom wall 60. The thickness of the filler member 104 is not uniform throughout. Rather, it is of step construction and hence includes a tapered shoulder 106 intermediate its ends which leads to a portion 108 of reduced thickness whose edge is adjacent a substantially circular hole 109 in the upper wall 86 of the housing.

Coming now to the coupling or lock member, the same includes a tubular vertically disposed stem 110 to the upper end of which is welded or otherwise secured a coupling pin 112 which extends through the hole 109 in the upper wall 86 of the housing and has an enlarged pyramidal-type head 114 that extends above the housing wall 86. The head has a crest 116 which is located substantially centrally between the sides of the head but is offset longitudinally from its center. Thus one end 118 is rounded and is flush with the periphery of the pin 112, whereas the opposite portion 120 extends a suitable distance beyond the periphery of the pin 112 and terminates in a squarer edge 122. The width of the head approximates that of the filler member 104 and hence is somewhat less than the width of the slot 74 in the bottom wall of the lower container corner member. The length of the head is such that when its end portion 122 is seated upon the top surface of the filler member 104 and its edge 118 is closely adjacent the hole 109 of the filler member, i.e. when the head 114 is aligned with the filler member 104, the combined length of the head and that of the filler member up to its tapered shoulder 106 approximates but is somewhat less than the length of the slot 74 in the bottom wall of the lower container corner member, so that when so aligned the filler member and head can both be inserted into the corner member through said slot.

Where the pin 112 connects to the upper edge of the tubular stem 110, it is reduced in diameter to provide an annular grease groove 124. Depending inwardly from the upper wall 86 of the housing is a boss 126 whose bore has a diameter slightly larger than that of the pin 112 and which encompasses the grease groove 124. From its upper edge 128, see FIG. 7, to a predetermined point somewhat below its mid point the stem 110 is provided with axially extending diametrically opposed elongated slots 130 opening through its wall, and below the lower ends 132 of these slots and axially aligned therewith are substantially circular openings or holes 134.

Mounted on the pin 112 is a group of Belleville (i.e. dished) spring washers 136. Slidably mounted on the upper end of the stem 110 is a collar 138, which when operatively connected in the structure, as will appear hereinafter, serves as a lower seat for the Belleville washers 136, the bottom surface of the boss 126 of the upper wall 86 of the housing serving as the upper seat.

A yoke member 140 is provided having spaced arms 142 and 144 joined by a web 146 from which a relatively short rod or stub 148 extends upon which can be readily slipped a length of pipe 150 to serve as an operating handle. A bolt 152 extends diametrically through the collar 138, through the slots 130 and 132 in the tubular stem 110 and through holes provided through the upper ends of the yoke arms 142 and 144, the head 154 of the bolt and nut 156 threaded thereon being disposed exteriorly of the yoke arms.

Another bolt 158 extends diametrically through the stem 110 and through the holes 134 thereof and thence through holes provided adjacent the lower ends of a pair of links 160 and 162, the head 164 of said bolt and the nut 166 threaded thereon being disposed exteriorly of said links.

The upper ends of the yoke arms 142 and 144 include downwardly extending portions 168 and 170 and short pins 172 and 174 pivotally interconnect the lower ends of said portions 168 and 170 of the yoke arms with the upper ends of said links 160 and 162. A coil spring 176 is interposed between the lower bolt 158 and the inner surface of the lower wall 88 of the housing and normally acts to urge the coupling member and its head 114 upwardly.

Figure 2:
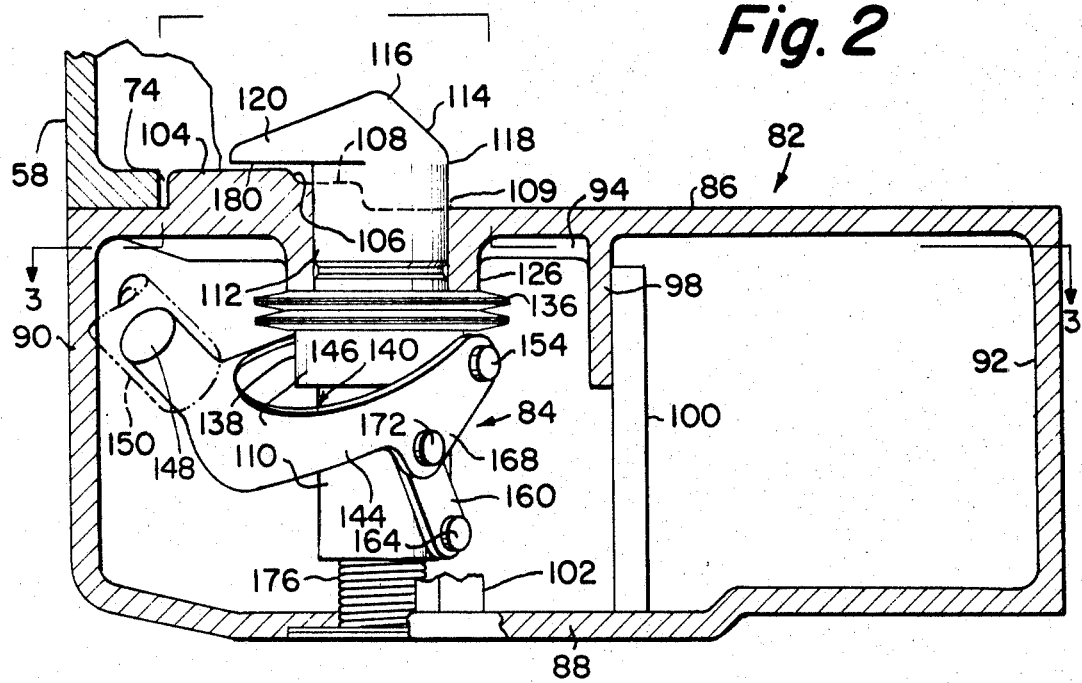
FIG. 2 is an enlarged vertical sectional view of a twist lock unit per se according to the instant invention, parts shown in elevation, with the coupling member being shown inserted in a container corner member but in the unlocked position.
Figure 3:
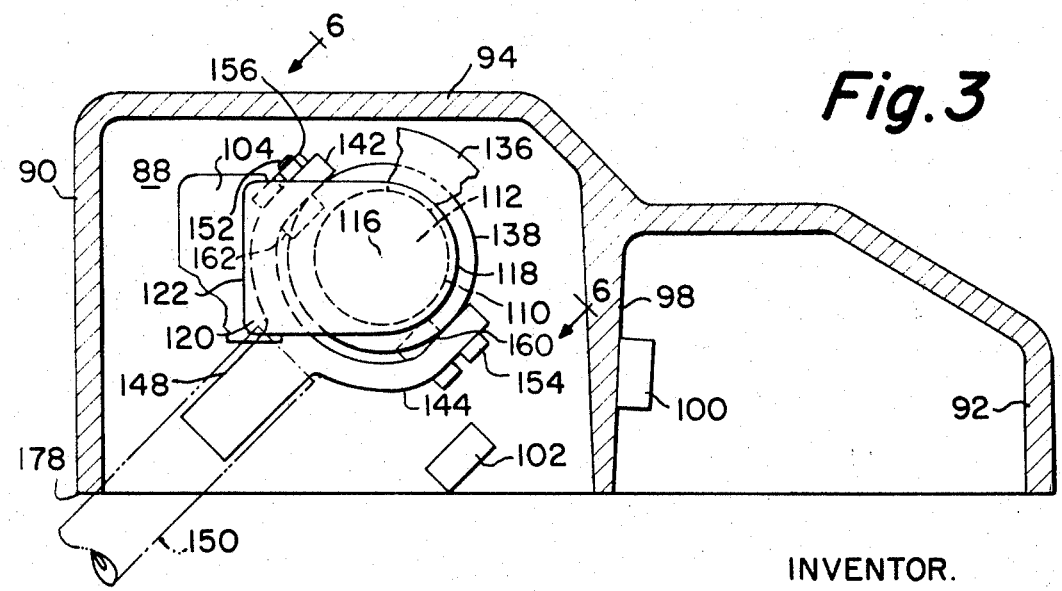
FIG. 3 is a sectional view taken on the line 3—3 of FIG. 2.
Figure 4:
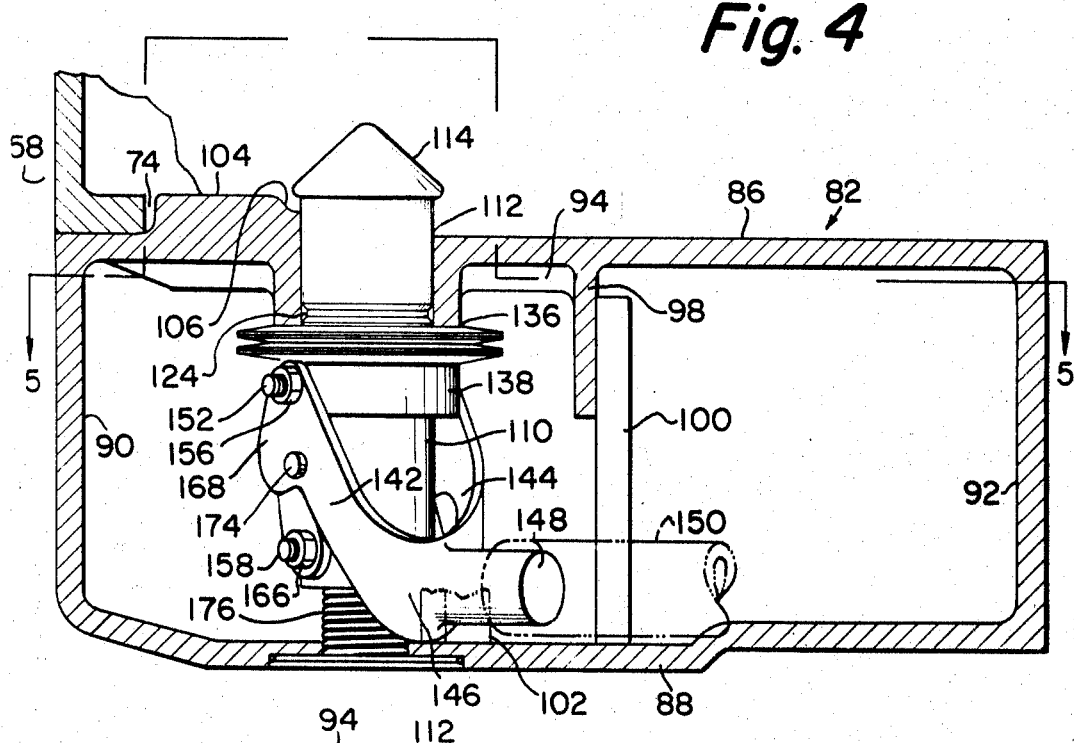
FIG. 4 is a view similar to FIG. 2 showing the locked position of the coupling member.
Figure 5:
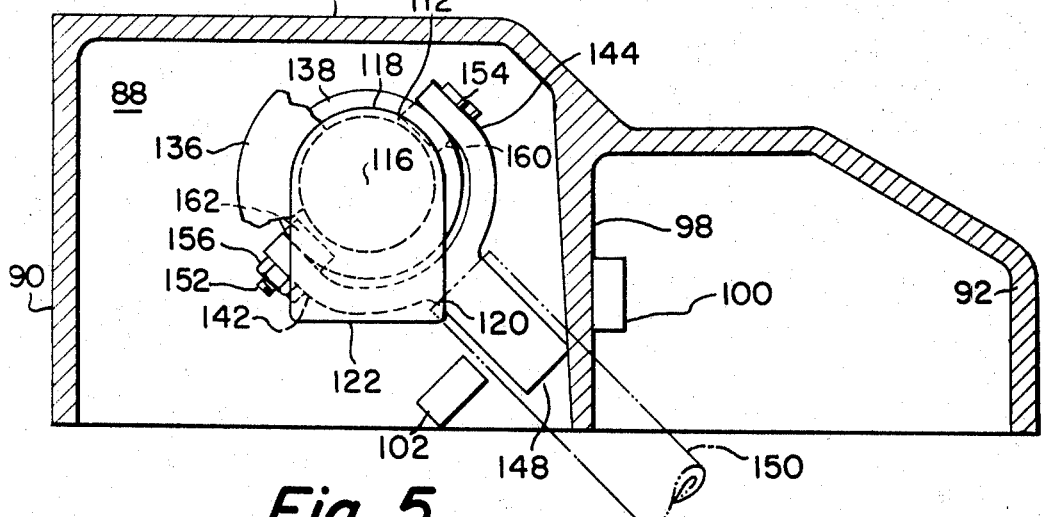
FIG. 5 is a sectional view taken on the line 5—5 of FIG. 4.

In use, the pipe handle 150 is turned in one direction until it engages the outer edge 178 of the end vertical wall 90 of the housing, in which position the head 114 is longitudinally aligned with the filler member 104 so that the portion 120 of the head overlies the filler member. With all four heads in this position, the container 10 is lowered onto the adapter frame 28 so that the filler member and head enter the lower corner members 26 through the bottom slots 74 thereof, the spring 176 urging the lower surface 180 above the upper surface of the filler member 104. The filler member acts to limit relative lateral and longitudinal movement of the container and the adapter frame. The handle 150 is then turned in an opposite direction until it engages the stop bar 100 of the housing as shown in FIG. 4. In doing so, the stem 110, collar 138, coupling pin 112 and head 114 are rotated 90°, the rotational loads being taken only by the bolt 152. In this position, the head 114 traverses the bottom slot 74 in the lower container corner member and thus captures the container. In both the insertion and coupled positions the handle is up as shown in FIG. 2 and the axis through pivot points 172 and 174 is overcenter in one direction relative to the axes through the upper and lower bolts 152 and 158 so that there is no load on the Belleville washers 136. To take up the slack and firmly pull the container against the adapter frame 28, the handle 150 is urged downwardly, as shown in FIG. 4, behind the retaining lug 102 of the housing. This causes the bolt 152 to slide up in the slots 130 of the stem and the collar 138 to apply a load on the Belleville spring washers 136, while the head 114 is pulled down against the bottom wall 60 of the lower container corner members, thus compressing coil spring 176. The tightening action is enhanced and a load is retained on the Belleville washers because a toggle action is produced due to the fact that the axes through the upper and lower bolts 152 and 158 are fixed while the axis through the pins 172 and 174 is movable and in the final position this latter axis passes beyond the center or vertical line passing through the axes of the bolts 152 and 158. The off-center position of the axis through pins 170 and 172 are lesser in magnitude in this final locked position than in the aforesaid unlocked position.

Figure 8:
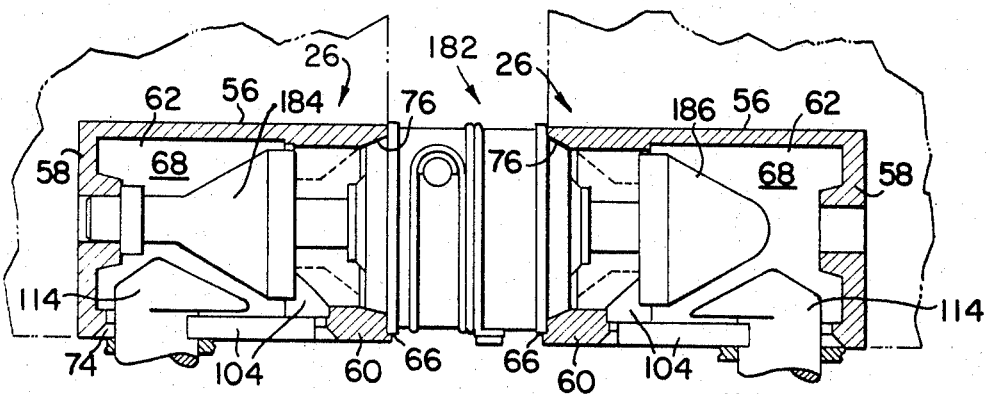
FIG. 8 is a diagrammatic view showing the coupling of the lower corner members of adjacent container to each other and to the adapter frame, the corner members being shown in section.

The carrier may desire to couple the containers end to end as well, as seen in FIG. 8, in which case he may use a double headed horizontal coupler 182 of the type shown and described in Patent No. 3,261,070. The heads 184 and 186 which are made to extend into the cavities 68 of adjacent lower corner members 26 through the slots in their respective end walls 66 are turned in unison to traverse these slots in the coupled position. Because the heads 114 on the coupling pins 112 are shallow and the crest 116 thereof is longitudinally offset, both the head 114 of the twist lock carried by the adapter frame and the head 184 (or 186) of the horizontal coupler can occupy the common cavity 68 without interference in the coupled and uncoupled positions.

While a preferred embodiment has here been shown and described, it will be understood that skilled artisans may make variations without departing from the spirit of the invention.

I claim:
1. An adapter frame for use with a substantially rectangular container having a plurality of lower hollow corner members each having a slot opening through the bottom wall of said corner member, said adapter frame being detachably coupleable to said container via said lower corner members and comprising:
   (a) a plurality of upstanding members each including a head whose length exceeds the width of said slot and adapted to enter said lower corner member through said slot;
   (b) means mounting said upstanding members for rotation on said adapter frame between an insertion position wherein said head is aligned with said slot and a coupled position wherein said head traverses said slot;
   (c) a handle for each of said upstanding members; and
   (d) a toggle means, for each of said upstanding members, operatively connecting said handle to said upstanding member to rotate said upstanding member between said insertion and coupled positions and, upon downward movement of said handle to urge said head, when said upstanding member is in said coupled position, tightly against said bottom wall to couple said frame to said container.

2. An adapter frame for use with a substantially rectangular container having a plurality of lower hollow corner members each having a slot opening through the bottom wall of said corner members, said adapter frame being detachably coupleable to said container via said lower corner members and comprising:
   (a) a plurality of upstanding members each including a head whose length exceeds the width of said slot and adapted to enter said lower corner members through said slot;
   (b) a housing, for each of said upstanding members, secured to said frame, said housing having an upper horizontal wall and means forming an opening in said upper horizontal wall, said upstanding member extending through said opening with said head disposed exteriorly of said wall;
   (c) a handle for each of said upstanding members;
   (d) means operatively connecting said handle to said upstanding member to rotate same, and to move said upstanding member downwardly upon downward movement of said handle;
   (e) a dished spring washer unit mounted on each of said upstanding members; and
   (f) means loading said spring washer unit upon downward movement of said handle.

3. An adapter frame as recited in claim 2 wherein said loading means includes said horizontal wall against which the upper end of said dished spring washer unit bears and a collar slidably mounted on said upstanding member bearing on the lower end of said dished spring washer unit, said means operatively connecting said handle to said upstanding member also being operatively connected to said collar to move said collar up and compress said dished spring washer unit upon downward movement of said handle.

4. An adapter frame as recited in claim 3 wherein said means operatively connecting said handle to said upstanding member includes a yoke having arms straddling said upstanding member, a pin extending through said arms diametrically through said collar and through vertical slots in said upstanding member so that said arms are pivotal around the axis of said pin and said pin is movable vertically of said upstanding member.

5. An adapter frame as recited in claim 4 including links pivoted to said arms and to said upstanding member beneath said vertical slots so that when the handle is fully down a toggle is produced between said links and said yoke arms.

References Cited

UNITED STATES PATENTS

| | | | |
|---|---|---|---|
| 2,963,310 | 12/1960 | Abolins. | |
| 3,027,025 | 3/1962 | Tantlinger | 296—35.1 X |
| 3,111,341 | 11/1963 | Fujioka et al. | 296—35.1 |
| 3,159,111 | 12/1964 | Gutridge et al. | 248—361 X |

KENNETH H. BETTS, *Primary Examiner.*

J. A. PEKAR, *Assistant Examiner.*

U. S. Cl. X.R.

105—366; 248—361